United States Patent
Ahlborg et al.

(10) Patent No.: US 10,995,005 B2
(45) Date of Patent: May 4, 2021

(54) THERMOCHEMICAL GAS REDUCTION PROCESS USING POLY-CATION OXIDE

(71) Applicant: The Board of Trustees of the Leland Stanford Junior University, Palo Alto, CA (US)

(72) Inventors: Nadia L. Ahlborg, Palo Alto, CA (US); William C. Chueh, Menlo Park, CA (US); Hyungyu Jin, Pohang (KR); Arunava Majumdar, Menlo Park, CA (US); Shang Zhai, Stanford, CA (US); Jimmy A. Rojas Herrera, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 674 days.

(21) Appl. No.: 15/796,766

(22) Filed: Oct. 28, 2017

(65) Prior Publication Data
US 2018/0118576 A1      May 3, 2018

Related U.S. Application Data

(60) Provisional application No. 62/414,482, filed on Oct. 28, 2016.

(51) Int. Cl.
| | |
|---|---|
| *C01B 32/40* | (2017.01) |
| *C01B 3/06* | (2006.01) |
| *C01B 21/02* | (2006.01) |
| *C01G 53/00* | (2006.01) |

(52) U.S. Cl.
CPC .............. *C01B 32/40* (2017.08); *C01B 3/063* (2013.01); *C01B 21/02* (2013.01); *C01G 53/40* (2013.01); *C01G 53/66* (2013.01); *C01G 53/68* (2013.01); *C01P 2002/70* (2013.01); *C01P 2002/72* (2013.01); *C01P 2002/76* (2013.01); *C01P 2002/88* (2013.01); *Y02E 60/36* (2013.01)

(58) Field of Classification Search
CPC ........... C01B 3/06; C01B 3/063; C01B 21/02; C01B 32/40; C01G 53/40; C01G 53/66; C01G 53/68
See application file for complete search history.

(56) References Cited

U.S. PATENT DOCUMENTS

| | | | |
|---|---|---|---|
| 8,435,486 B2 | 5/2013 | Takeshima | |
| 8,540,962 B2* | 9/2013 | Kodama | ................ C01B 3/061 423/658 |
| 8,940,269 B2 | 1/2015 | Davis | |
| 9,279,188 B2 | 3/2016 | Diver, Jr. | |
| 2006/0188433 A1 | 8/2006 | Weimer | |
| 2014/0102912 A1* | 4/2014 | Palumbo | ................ C01B 3/063 205/340 |

OTHER PUBLICATIONS

Szotek et al. Physical Review, (2006), B74 174431-1 to 12.*
Rost et al., "Entropy-stabilized oxides," Nat. Commun. 6, 9485 (2015).
Lorentzoua et al., "Thermochemical redox cycles over Ce-based oxides" Energy Procedia 69 (2015) 1800-1809.
Lorentzou et al., "Thermochemical CO2 and CO2/H2O splitting over NiFe2O4 for solar fuels synthesis," Energy Procedia 49 (2014) 1999-2008.

* cited by examiner

*Primary Examiner* — Yong L Chu
(74) *Attorney, Agent, or Firm* — Lumen Patent Firm (57) ABSTRACT

A two-step thermochemical gas reduction process based on poly-cation oxides includes repeatedly cycling a thermal reduction step and a gas reduction step. In the thermal reduction the poly-cation oxide is heated to produce a reduced poly-cation oxide and oxygen. In the gas reduction step, the reduced poly-cation oxide is reacted with a gas to reduce the gas, while reoxidizing the poly-cation oxide. The poly-cation oxide has at least two distinct crystal structures at two distinct temperatures and is capable of undergoing a reversible phase transformation between the two distinct crystal structures. For example, the poly-cation oxide may be an entropy tuned mixed metal oxide, such as an entropy stabilized mixed metal oxide, where the entropy-tuning is achieved via change in crystal structure of one of more of the compounds involved. The gas reduction process may be used for water splitting, $CO_2$ splitting, $NO_x$ reduction, and other gas reduction processes.

4 Claims, 10 Drawing Sheets

THERMOCHEMICAL GAS REDUCTION PROCESS USING POLY-CATION OXIDE

CROSS-REFERENCE TO RELATED APPLICATIONS

This application claims priority from U.S. Provisional Patent Application 62/414,482 filed Oct. 28, 2016, which is incorporated herein by reference.

FIELD OF THE INVENTION

The present invention relates generally to gas reduction processes using thermochemical redox reactions. More specifically, it relates to improvements to metal-oxide-based thermochemical redox reactions.

BACKGROUND OF THE INVENTION

Metal-oxide-based thermochemical redox reactions have many applications, including water splitting and carbon dioxide splitting for production of hydrogen fuel and/or carbon monoxide precursors for syngas. For example, a two-step thermochemical splitting of $H_2O$ or $CO_2$ using metal oxide based redox reactions can be used to produce $H_2$ or CO, respectively. In a first step, metal oxides are reduced at high temperature, producing oxygen gas. In a second step, $H_2O$ or $CO_2$ is reduced while the metal oxide is oxidized. The metal oxide then repeats the cycle. The thermodynamic cycle is essentially a redox heat engine.

The most significant barrier for commercialization of current metal-oxide-based thermochemical redox reactions is the requirement of high operation temperatures and high expense that does not allow economies of scale. For example, existing metal oxide-based redox materials such as substituted ceria, two-metal ferrites, and perovskite oxides require temperatures 1300° C. to 1400° C., since they do not produce useful amounts of $H_2$ at thermal reduction temperatures ($T_H$) less than 1100° C. This high temperature requirement is a critical limitation for industrial applications because today's chemical infrastructure relies almost exclusively on thermochemical transformations in the regime less than 1100° C. Operating at higher temperatures causes serious material compatibility issues in practice. Thus, it would be an important and valuable advance to overcome these existing problems with the state of the art.

BRIEF SUMMARY OF THE INVENTION

The present invention provides effective and reliable methods for thermochemical redox reactions that can yield desired chemical products using process temperatures below 1300 C. In contrast with existing approaches, the invention has lower operation temperatures and can use powder materials, making the technology practical for industrial applications. It also has economy of scale, i.e., the cost goes down with increasing production scale.

Embodiments of the invention provide thermochemical redox reactions that make use of new poly-cation oxide materials, such as high-entropy mixed metal oxides, that have a large entropy change associated with a phase transformation.

Advantageously, the large entropy change associated with a reversible phase transformation in these new materials allow various thermochemical redox reactions to be performed at operation temperatures below 1300 C, which is significantly lower than that possible with existing metal oxide-based redox materials. Despite the lower operation temperatures, these poly-cation oxide materials show fast oxygen release kinetics, comparable to those of state-of-the-art materials such as ceria at higher temperatures. In fact, below certain temperatures, state-of-the-art materials such as ceria are thermodynamically prohibited to perform gas splitting, whereas the poly-cation oxide materials are not. In addition to maintaining high reaction rates, these poly-cation oxide materials also have high oxygen release capacity even at lowered operation temperatures. Also, conventional industrial thermochemical systems may be used to implement the process at large scales. In addition, the poly-cation oxide materials may be in a powder form, which has an advantage that the process can be easily scaled up volumetrically, so it may benefit from economies of scale.

In one aspect, the invention provides a two-step thermochemical gas reduction process comprising repeatedly cycling a thermal reduction step and a gas reduction step. The thermal reduction step includes heating a poly-cation oxide ($MeO_x$) under a reduced partial oxygen pressure to produce a reduced poly-cation oxide ($MeO_{x-1}$) and oxygen gas ($O_2$). The gas reduction step includes reacting the reduced poly-cation oxide ($MeO_{x-1}$) with a first gas to produce a second gas and reoxidized poly-cation oxide ($MeO_x$), where the first gas is reduced into the second gas. The poly-cation oxide used in the process has at least two distinct crystal structures at two distinct temperatures corresponding to two distinct average oxidation states of at least one transition metal in a transformation between $MeO_x$ and $MeO_{x-1}$, and is capable of undergoing a reversible phase transformation between the two distinct crystal structures. For example, the poly-cation oxide may be an entropy tuned mixed metal oxide, such as an entropy stabilized mixed metal oxide, where the entropy-tuning is achieved via change in crystal structure of one of more of the compounds involved. The mixed metal oxide ($MeO_x$) may be a mixed metal oxide ($Me_1O, \ldots, Me_nO)O_x$, i.e., a mixture of multiple metal oxides $Me_1O, \ldots, Me_nO$, e.g., an equimolar mixture of MgO, CoO, NiO, FeO and ZnO.

In one implementation, the gas reduction process may be a water splitting process for hydrogen gas production, where the gas reduction step is a water splitting step, where the first gas is water vapor and the second gas is hydrogen gas. In another implementation, the gas reduction process is a $CO_2$ splitting process for CO gas production, where the gas reduction step is a $CO_2$ splitting step, where the first gas is $CO_2$ and the second gas is CO. In another implementation, the gas reduction process is a $NO_x$ reduction process for $N_2$ gas production, where the gas reduction step is a $NO_x$ reduction step, where the first gas is $NO_x$ and the second gas is $N_2$.

Applications include syngas production by combining water splitting for hydrogen production and reduction of carbon dioxide to carbon monoxide. Applications also include various chemical looping reactions for hydrocarbon fuel production, and thermal energy storage.

DETAILED DESCRIPTION OF THE INVENTION

Figure 1A:
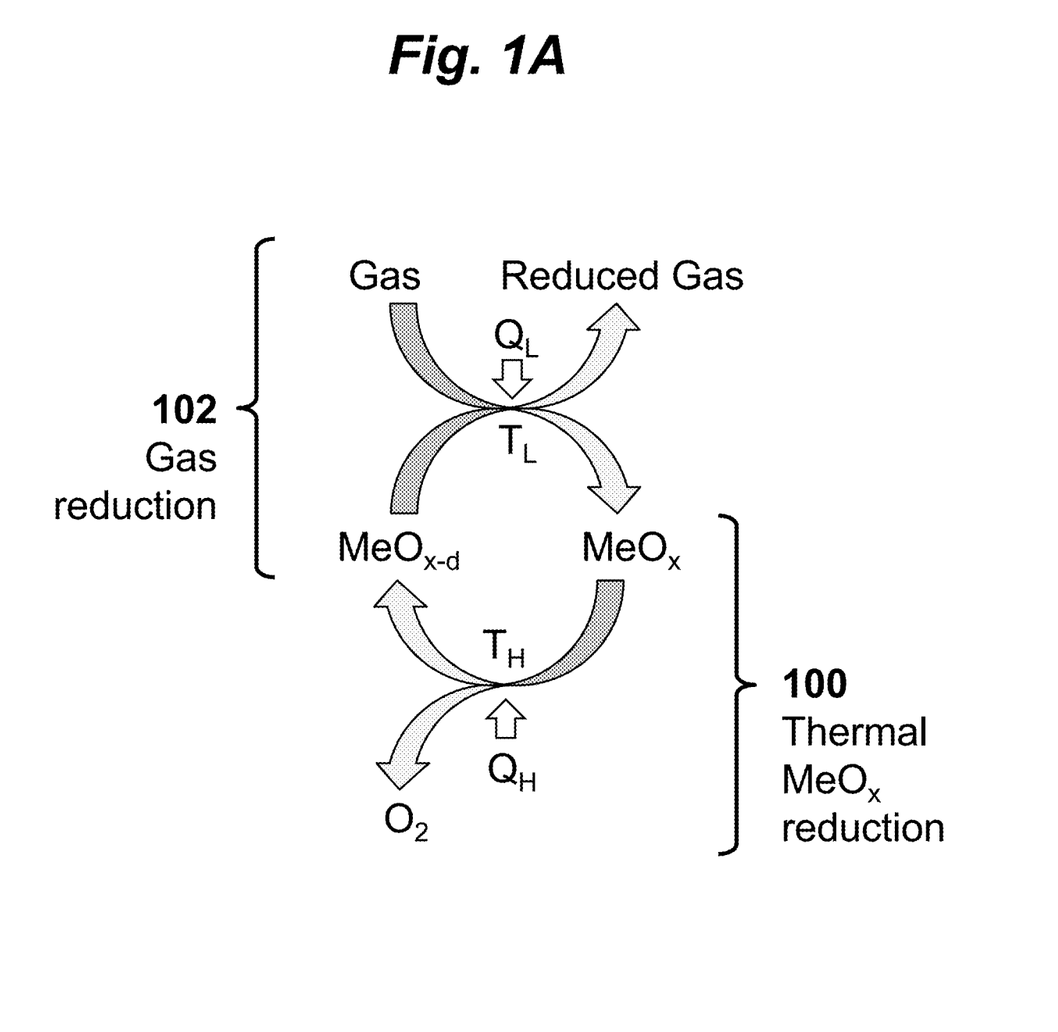
FIGS. 1A-C are schematic diagrams illustrating a two-step thermochemical gas reduction process according to embodiments of the invention.
Figure 1B:
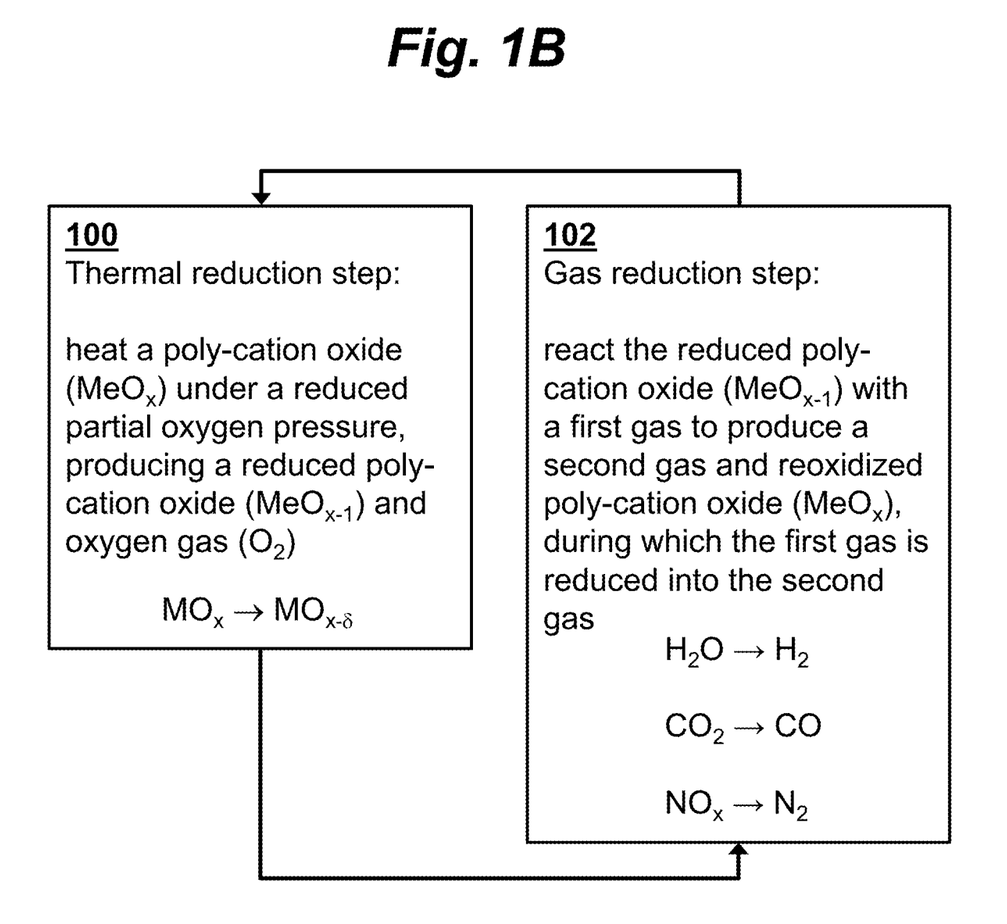

FIGS. 1A-B are schematic diagrams illustrating a two-step thermochemical gas reduction process according to embodiments of the invention. The process involves repeatedly cycling a thermal reduction step and a gas reduction step. In the first step 100 of this cycle, poly-cation oxide ($MeO_x$) is reduced by heating it at a high temperature $T_H$ and under reduced oxygen partial pressure ($p(O_2)$), producing a reduced poly-cation oxide ($MeO_{x-1}$) and releasing $O_2$, $$MeO_x \rightarrow MeO_{x-d} + \delta/2\ O_2$$

where Me represents a poly-cation (i.e., a group of cations). In the second step 102, the reduced poly-cation oxide ($MeO_{x-d}$) is reacted at lower temperature $T_L$ with a first gas to reduce the gas, producing a second gas and reoxidized poly-cation oxide ($MeO_x$).

A key feature of the process is the use of a poly-cation oxide that has two distinct crystal structures at the two distinct temperatures $T_H$ and $T_L$. These crystal structures correspond to two distinct average oxidation states, $MeO_x$ and $MeO_{x-d}$. The poly-cation oxide is capable of undergoing a reversible phase transformation between these two distinct crystal structures. In some embodiments, the poly-cation oxide may be an entropy tuned mixed metal oxide, such as an entropy stabilized mixed metal oxide, where the entropy-tuning is achieved via change in crystal structure of one of more of the compounds involved. In specific implementations, the mixed metal oxide ($MeO_x$) may be a mixed metal oxide of the form ($Me_1O, \ldots, Me_nO)O_x$, i.e., a mixture of multiple metal oxides $Me_1O, \ldots, Me_nO$. For example, the poly-cation oxide may be an equimolar mixture of MgO, CoO, NiO, FeO and ZnO.

As shown in FIG. 1B, the gas reduction step 102 may be used to reduce various different gasses, for example, the reduction of $H_2O$ to $H_2$ (i.e., water splitting), the reduction of $CO_2$ gas to CO (i.e., carbon dioxide splitting), or the reduction of $NO_x$ to $N_2$:

$$MeO_{x-1} + H_2O \rightarrow MeO_x + H_2$$

$$MeO_{x-1} + CO_2 \rightarrow MeO_x + CO$$

or $$MeO_{x-y} + NO_y \rightarrow MeO_x + \tfrac{1}{2}N_2.$$

For purposes of illustration, the process will now be described in detail for the case of water splitting.

Using the new poly-cation oxides (PCOs) the two-step process thermochemically splits water to produce hydrogen and oxygen. For the PCO (FeMgCoNi)$O_x$, the process produces hydrogen yields of 11.96±0.15 mL-$H_2$/g and 3.65±0.15 mL-$H_2$/g at thermal reduction temperatures 1300° C. and 1100° C., respectively, even in the presence of background hydrogen. Remarkably, these capacities are significantly higher than those measured using state-of-the-art materials such as substituted ceria and two-metal ferrites.

In order to be commercially feasible, a thermochemical water splitting process should have large $O_2$ production at $T_H$; high $H_2O$-to-$H_2$ conversion at $T_L$; and long-lasting resuse of the reactor and the redox material. To lower $T_H$ while maximizing $H_2O$-to-$H_2$ conversion, the partial molar enthalpy and entropy ($\Delta H_O$ and $\Delta S_O$, respectively) of the redox oxide should fall within a narrow window of thermodynamic feasibility defined by negative Gibbs free energy changes ($\Delta G<0$) for the reactions at $T_H$ and $T_L$. For existing metal oxides (such as ceria, substituted ceria, and Co and Ni-substituted ferrites), the $\Delta H_O$ and $\Delta S_O$ fall in this window and provide useful $H_2$ production only when $T_H \geq 1400°$ C. and $p(O_2)=10^{-5}$ atm. However, the use of industrial reactors with cost-effective materials requires lower temperatures of $T_H \leq 1100°$ C. and preferably <1000° C. These limitations motivated the present inventors to search for new materials that could evolve $O_2$ at a lower $T_H$ and split water in the presence of background $H_2$.

The inventors found that some recently discovered oxides—entropy stabilized oxides (ESOs)—could be used in thermochemical redox reactions. These ESOs exchange oxygen via a reversible solid-solid phase transition. Equimolar quantities of multiple metal oxides (MgO, CoO, NiO, CuO and ZnO) of various crystal structures are mixed and heated them up to 1000° C. in air. The entropy of mixing of the large number of cations stabilizes the complex oxide, denoted as (MgCoNiCuZn)O, within only one rocksalt structure, during which the oxide loses some oxygen to the environment. At lower temperatures, this ESO undergoes phase separation into rocksalt and tenorite structures also by entropic driving force. Meanwhile, oxygen is absorbed from the environment.

In embodiments of the invention, ESO mixed metal oxide materials may be obtained by initially mixing N ($2 \leq N \leq 6$) binary metal oxides (MeO) with the equimolar concentrations and sintering them at a temperature between 1000 C and 1300 C. In the course of the heating process, entropic driving force leads to a reversible phase transformation of the materials from a low entropy multi-phase to high entropy single-phase state. This reversible phase transformation enables designing materials with a large entropy swing between two temperatures, which can give high product yield capacity at moderate temperatures in two-step thermochemical redox reactions. For example, we have demonstrated that a high-entropy mixed metal oxide with the composition (Mg,Ni,Co,Zn,Fe)O gives significant and reversible hydrogen production via two-step thermochemical water splitting reactions between 1200 C and 700 C. Significantly, the oxygen release kinetics at 1200 C is extremely fast, comparable to the state-of-the-art materials such as ceria, suggesting rapid oxygen transport characteristics previously found primarily in non-phase-change materials. This is the first demonstration of water splitting in this new class of material.

Inspired by ESOs, the inventors have expanded the idea of cation mixing to a broader class of materials, poly-cation oxides (PCOs), and shown that these provide unexpected advantages in two-step thermochemical water splitting, and thermochemical redox reactions in general. A PCO has three or more metal cations distributed between two different solid phases (e.g., rocksalt and spinel) whose ratio can swing during oxygen exchange cycles between $T_H$ and $T_L$. Unlike ESOs, however, PCOs need not undergo a complete transition to a single phase, but instead contain a mixture of phases whose fractions swing between $T_H$ and $T_L$, and is accompanied by oxygen exchange.

Examples of PCOs that display TWS capabilities include $(MgFeCoNi)_{0.8}Li_{0.1}Ga_{0.1}O_x$, $(LiMgFeCoNi)O_x$, $(MgAlFeCoNi)O_x$, $(MgTiMnCoNi)_{0.75}Fe_{0.25}O_x$, $(MgMnCoNi)_{0.75}Fe_{0.25}O_x$, $(MgFeCoNiZn)O_x$, and $(MgFeCoNiCe)O_x$ $(CoNi)_{0.65}Fe_{0.35}O_x$. Compositions in parenthesis correspond to equimolar concentrations. These materials may be prepared by the solid-state method.

Figure 1C:
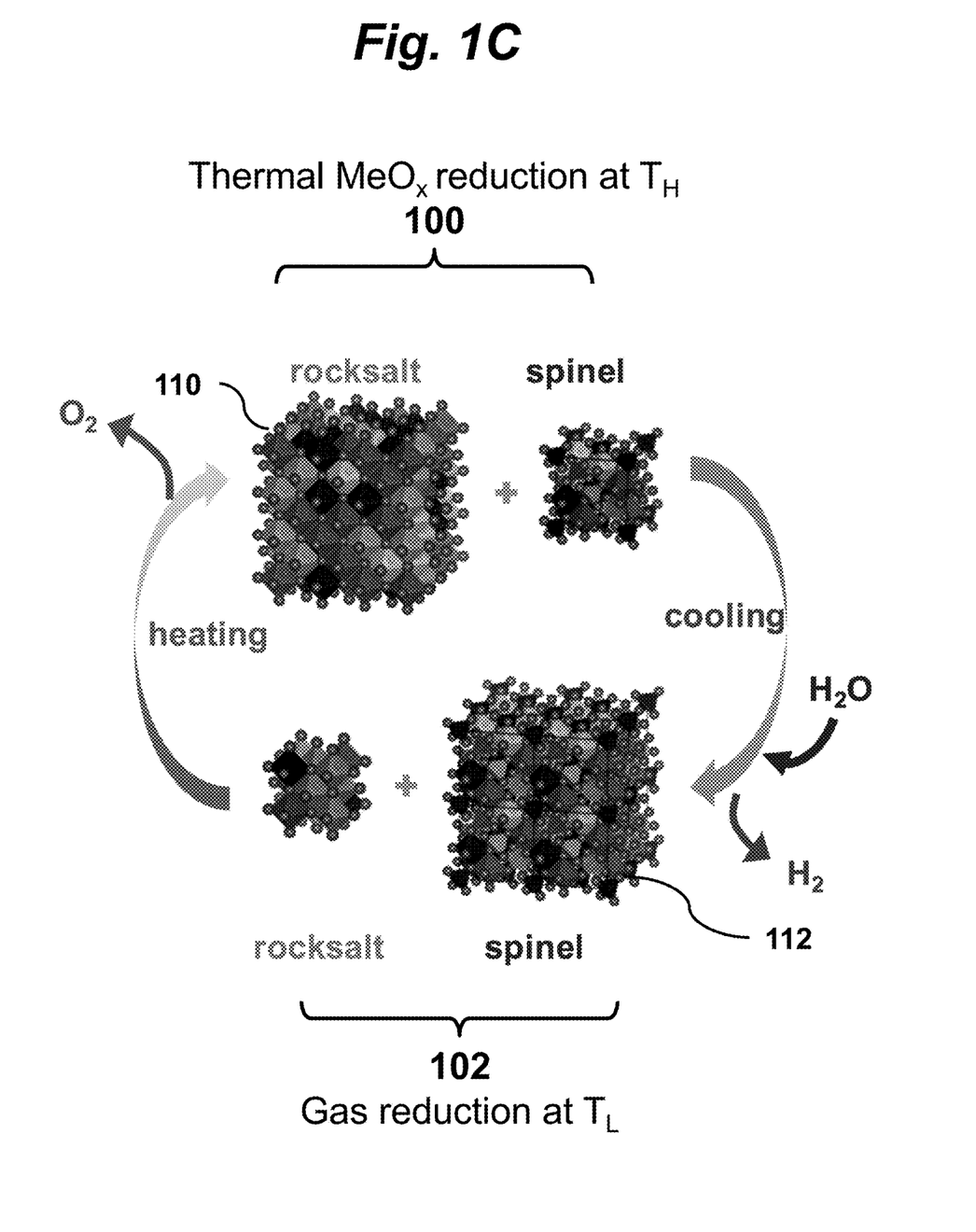

FIG. 1C is a schematic of two-step thermochemical water splitting (TWS) process using poly-cation oxides (PCOs) of the present invention. In two-step TWS, an ESO metal oxide $(MeO_x)$ becomes thermally-reduced at a higher temperature, $T_H$, and releases $O_2$ to produce $MeO_y$ (y<x). The reduced oxide is cooled to a lower temperature, $T_L$, where it is oxidized by water to produce $H_2$ as it returns to $MeO_x$. The mixed metal oxide undergoes a reversible phase transformation between two crystal structures corresponding to the two oxidation states. Using PCOs, a reversible phase swing between rocksalt (reduced) 110 and spinel (oxidized) 112 phases occurs during thermochemical cycling. The rocksalt-to-spinel ratio becomes larger in a PCO at $T_H$ compared to that at $T_L$.

PCOs and ferrites may be synthesized using solid-state (SS) or sol-gel (SG) techniques. As an illustration, following is a method of solid state synthesis of an example PCO, $(FeMgCoNi)O_x$. All reagents were used without further purification treatment. For the solid-state (SS) synthesis, reagents in powder forms were mixed. To synthesize (FeMgCoNi)$O_x$, magnesium oxide (99.99%, Sigma-Aldrich), iron (II,III) oxide (99.997%, Alfa Aesar), cobalt (II,III) oxide (99.7%, Alfa Aesar) and nickel (II) oxide (99.99%, Sigma-Aldrich) with equimolar of cations were mixed for 1 min at 2000 rpm in a Vortex Mixer. The mixture was then transferred into an agate mortar and ground in acetone for 2 min. Calcinations were sequentially performed at 1000° C. and 1350° C. for 4 hours each (3° C./min between them), before a final cooling at 6° C./min to 500° C. and a natural cooling thereafter. The sintered sample chunk was then broken and sieved (Fisherbrand stainless steel sieves) into 0.5~1.0 mm pieces (for TGA) or 1.0~2.0 mm pieces (for stagnation flow reactor).

Alternative, following is a sol-gel synthesis method. This synthesis method gives smaller particle size and bigger surface area than solid-state synthesis. For (FeMgCoNi)$O_x$, magnesium nitrate hexahydrate (99%, Sigma-Aldrich), iron (III) nitrate nonahydrate (≥98%, Sigma-Aldrich), cobalt(II) nitrate hexahydrate (≥98%, Sigma-Aldrich) and nickel(II) nitrate hexahydrate (crystalline, Sigma-Aldrich) with equimolar cations were dissolved in DI water with precursors: water=1:4 in mass. EDTA (ethylenediamine tetraacetic acid, ACS, MP Biomedicals) and citric acid (≥99.5%, Sigma-Aldrich) were added to the solution with 60% and 75% the total amount of metal ions, respectively. With 300 rpm stirring, ammonium hydroxide solution (28%-30%, Fisher Chemical) was added until pH=11, and a dark solution formed. The resulting solution was stirred and heated on a hot plate at 200° C. for about 5 hrs (gelation). The spin bar was removed and the temperature was increased to 300° C. to dry the gel overnight, during which foaming happened and gel became almost solid. The beaker was then moved to a box furnace and heated at 300° C. for 1 hr. The sample was ground into powder, transferred to an alumina boat and went through the following calcination: 10° C./min until 800° C. and 5° C./min until 1100° C. (1000° C. for $T_H$=1000° C.), 5° C./min until 800° C. and then natural cooling. For $T_H$=1000° C. TWS experiments, the maximum calcination temperature was 1000° C. instead of 1100° C. Besides, graphite (<150 μm, powder, 99.99%, Sigma-Aldrich) and 300° C. heated PCO with mass ratio 2:5 was ground with pestle in mortar before treatment at 1000° C.; acetone was used to help mixing.

To test two-step TWS yields with the PCO materials, a custom thermogravimetric analyzer (TGA) setup connected to an oxygen sensor was used. Because the reaction rate in the TGA is limited by the temperature ramp rate and the gas flow rate and dynamics, a stagnation flow reactor with a mass spectrometer was also used as validation and to measure kinetics and directly quantify $H_2$ production.

FIGS. 2A, 2B, 2C, 2D, 2E, 2F illustrate thermochemical water splitting performance of poly-cation oxides (PCOs) $Fe_{0.35}(MgCoNi)_{0.65}O_x$ and $(FeMgCoNi)O_x$, compared with that of ceria ($CeO_2$) and ferrites, using a custom-built stagnation flow reactor.

Figure 2A:
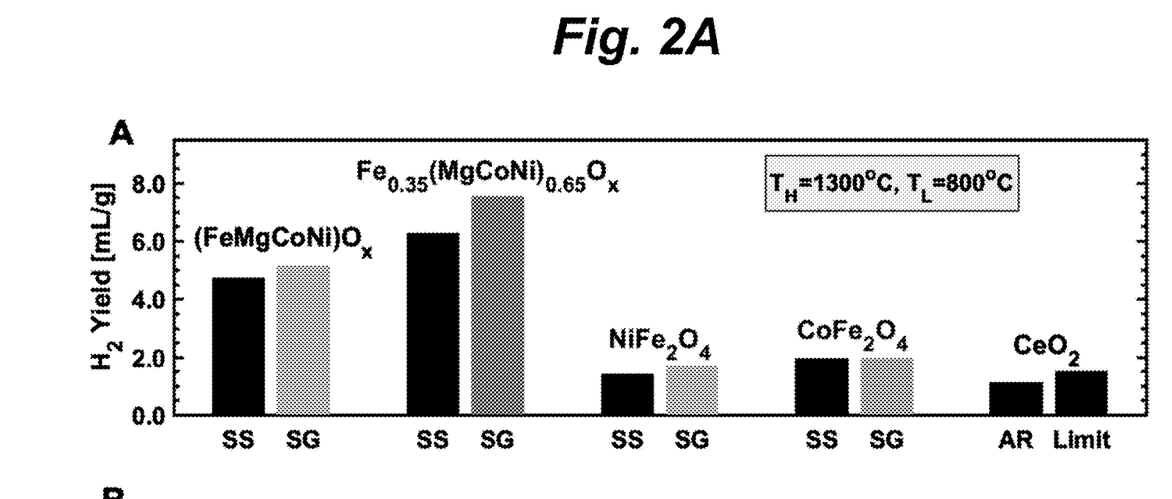
FIGS. 2A-F are graphs illustrating experimental results of thermochemical water splitting performance of poly-cation oxides (PCOs) compared with that of ceria and ferrites.
Figure 2B:
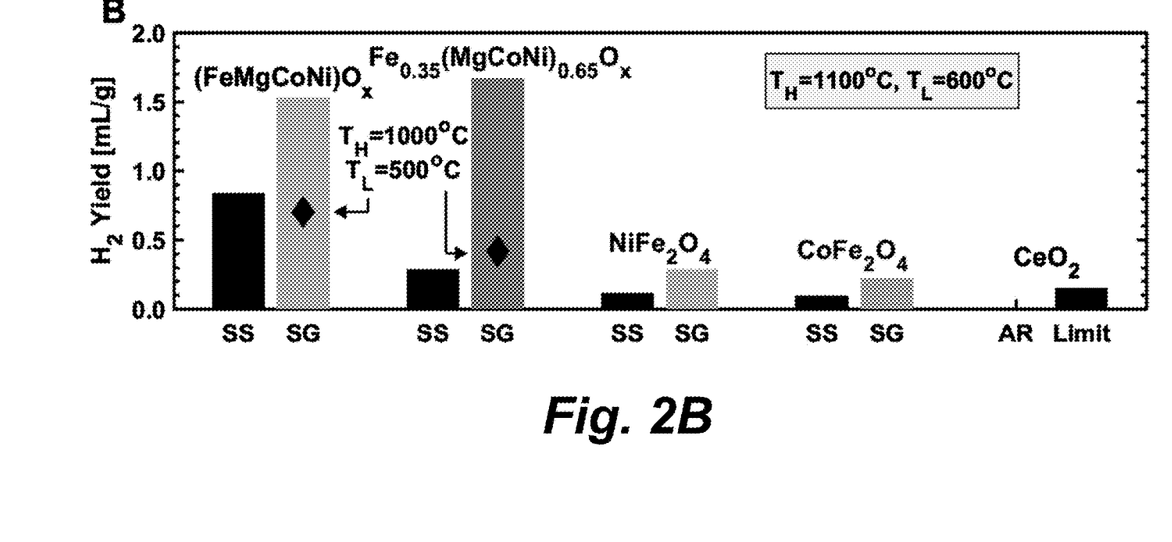

FIG. 2A and FIG. 2B show the measured $H_2$ yields of the both SS and SG-synthesized PCOs [$Fe_{0.35}(MgCoNi)_{0.65}O_x$ and $(FeMgCoNi)O_x$] as well as nickel ferrite (SS, SG), cobalt ferrite (SS, SG) and $CeO_2$ (as-received, 'AR') at three different TWS conditions, namely: (1) $T_H$=1300° C. and $T_L$=800° C.; (2) $T_H$=1100° C. and $T_L$=600° C.; (3) $T_H$=1000° C. and $T_L$=500° C. These measurements involved 30 mins at $T_H$ for $O_2$ evolution and 1 hour at $T_L$ for $H_2$ evolution. During the thermal reduction step at $T_H$, Ar was flowed to maintain $p(O_2)$~10 ppm (5 to 20 ppm), while 91 ppm of background $H_2$ and 9.5% $H_2O$ (equivalently, $p(H_2)$:$p(H_2O)$=1:1044) was used for the water splitting step at $T_L$. This gas composition at $T_L$ emulates the $H_2$ concentration that would be present in a realistic reactor and sets the equilibrium between the metal oxide and a well-defined $H_2$:$H_2O$ (abbreviation for $p(H_2)$:$p(H_2O)$) ratio. FIG. 2A shows that at $T_H$=1300° C. and $T_L$=800° C., PCOs yield more than twice $H_2$ compared to ceria or two-metal ferrites. The performance of sol-gel (SG) synthesized samples is marginally higher than that of solid-state (SS) synthesized ones. The measured value for $CeO_2$ is close to its thermodynamic limit of 1.41 mL-$H_2$/g. The measured $H_2$ yield for $CeO_2$ in FIG. 2A is close to the thermodynamic $H_2$ production limit of 1.41 mL/g. FIG. 2B shows that at $T_H$=1100° C. and $T_L$=600° C., SG synthesized PCOs yield ~1.5 mL-$H_2$/g, whereas ferrites and $CeO_2$ (as-received, 'AR'; thermodynamic limit, 'Limit') yield almost no $H_2$; SG synthesis nearly doubles the $H_2$ production of PCOs compared to that of SS synthesized samples. At $T_H$=1000° C. and $T_L$=500° C., only PCOs produce reasonable $H_2$ yield, whereas ferrites and $CeO_2$ cannot split water because they are thermodynamically prohibited. The experimental $H_2$ production for $CeO_2$ cycled between 1100° C. and 600° C. (FIG. 2B) was below the detection limit, which is also consistent with the thermodynamic limit (0.16 mL/g) considering the TGA detection uncertainty (±0.15 mL/g). At $T_H$=1300° C. and $T_L$=800° C., the $H_2$ yields of the PCOs are above two times higher than that of ferrites and significantly above the thermodynamic limit for $CeO_2$. Additionally, at $T_H$=1100° C. and $T_L$=600° C., when ferrites and $CeO_2$ almost stop producing $H_2$, PCOs exhibit an even larger advantage. Remarkably, SG-synthesized (FeMgCoNi)$O_x$ is still able to produce reasonable $H_2$ yields (~0.70±0.15 mL/g) at reaction temperatures as low as $T_H$=1000° C. and $T_L$=500° C., a regime where ferrites and ceria are either thermodynamically prohibited or do not produce appreciable $H_2$.

Figure 2C:
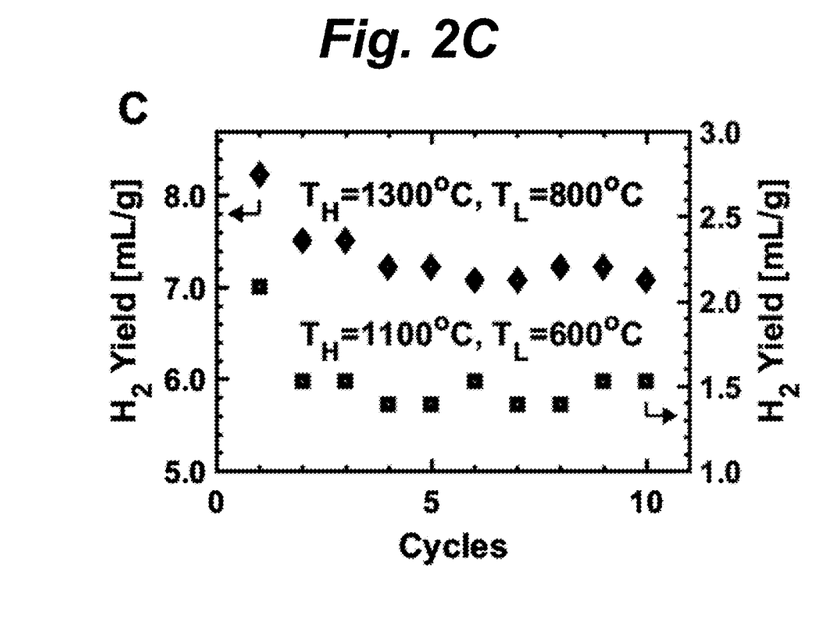

FIG. 2C shows ten cycles of $H_2$ production using SG-synthesized $Fe_{0.35}(MgCoNi)_{0.65}O_x$. FIG. 2C shows that SG-synthesized $Fe_{0.35}(MgCoNi)_{0.65}O_x$ produces less $H_2$ in the second cycle compared to the first, but shows no noticeable performance degradation during the following 9 cycles. Hence, all data in FIG. 2A and FIG. 2B used the measurements from the second thermochemical cycle. The SG-synthesized samples, with particles sizes around 1-10 μm, generally result in higher $H_2$ yield than that of the SS-synthesized ones with particle sizes in the 10-100 μm range. This suggests that the larger surface area helps the TWS reaction yield, thus offering the potential to further improve the $H_2$ yield in the future via morphology control.

Figure 2D:
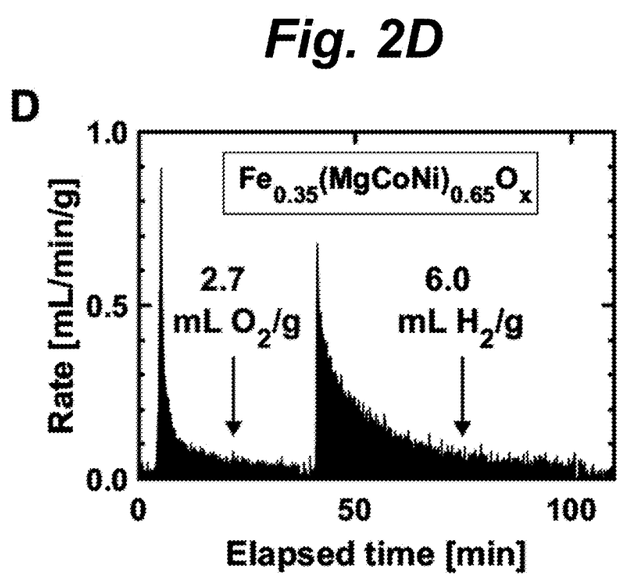

FIG. 2D shows Kinetics of a typical two-step TWS cycle in a stagnation flow reactor for $Fe_{0.35}(MgCoNi)_{0.65}O_x$ at $T_H=1300°$ C. and $T_L=800°$ C. under $H_2:H_2O$ ratio of $10^{-3}$. Thermal reduction kinetics ($O_2$ production) are faster than water splitting ($H_2$ production). For the measurements in FIGS. 2A-D, the samples were held at $T_H$ for 30 minutes and at $T_L$ for 1 hour. Cycles carried out in the stagnation flow reactor show $H_2$ productivity (FIG. 2D) of SS-synthesized $Fe_{0.35}(MgCoNi)_{0.65}O_x$ and $(FeMgCoNi)O_x$ consistent with the TGA evaluation based on the sample mass change. Thermal reduction at $T_H=1300°$ C. is significantly faster than water splitting at $T_L=800°$ C., with background $H_2:H_2O=1:1000$. The peak rates of 0.89 mL/min/g $O_2$ and 0.67 mL/min/g $H_2$ in FIG. 2D for $Fe_{0.35}(MgCoNi)_{0.65}O_x$ are promising, considering that the sample morphology used in these kinetic experiments (solid-state synthesized) was not optimized.

Figure 2E:
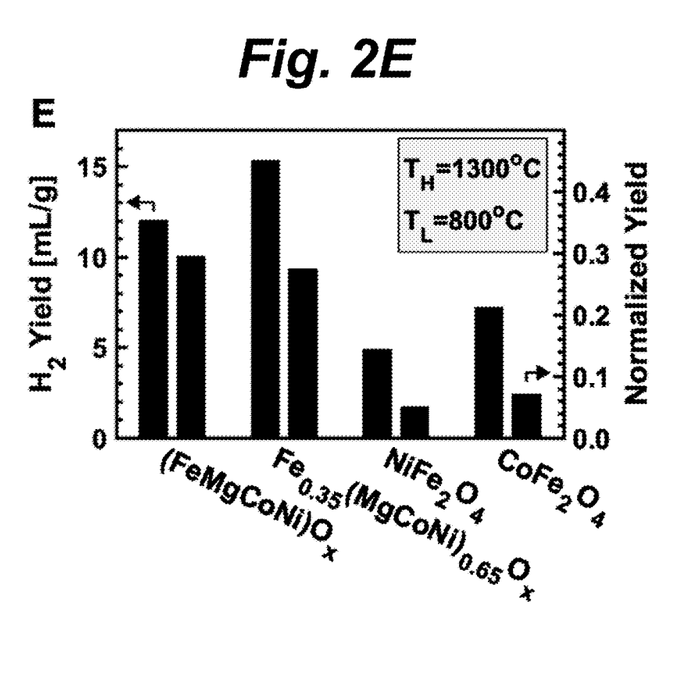
Figure 2F:
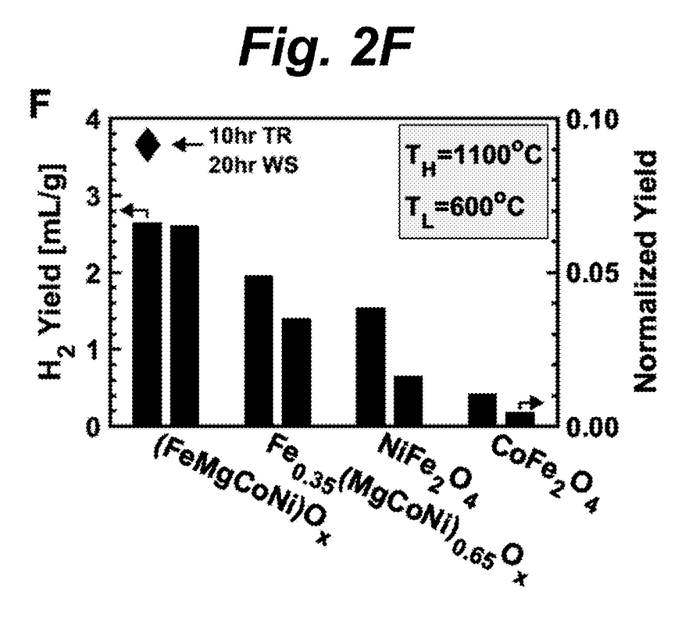

FIG. 2E shows that long cycle (5 hrs thermal reduction at $T_H=1300°$ C.+10 hrs water splitting at $T_L=800°$ C.) results with SG-synthesized samples. $Fe_{0.35}(MgCoNi)_{0.65}O_x$ gives the $H_2$ yield of as high as 15.30±0.15 mL/g, which is higher than the thermodynamic limits of both ferrites and $CeO_2$. This value is 27.4% of its "redox limit", defined by assuming all Fe goes through +2/+3 redox swing. Such normalization by Fe redox limit is shown as "Normalized Yield". FIG. 2F shows that long cycle (5 hrs thermal reduction at $T_H=1100°$ C.+10 hrs water splitting at $T_L=600°$ C.) results with SG synthesized samples. $(FeMgCoNi)O_x$ yields 2.64±0.15 mL-$H_2$/g. The diamond indicates $(FeMgCoNi)O_x$ yields 3.65±0.15 mL-$H_2$/g from an even longer cycle of 10 hrs at $T_H=1100°$ C. and 20 hrs at $T_L=600°$ C.

All results in FIGS. 2A-F were obtained using the TGA reactor except for the data in FIG. 2D. In the TGA reactor, thermal reduction at $T_H$ was achieved in ~10 ppm background $O_2$ whereas water splitting at $T_L$ was achieved in 91 ppm background $H_2$ and 9.5% $H_2O$ (balance gas Ar). The uncertainty in the $H_2$ yield due to thermal mass noise of TGA is ±0.15 mL-$H_2$/g, and the scatter from repeatability tests in the TGA is ±0.10 mL-$H_2$/g.

Assuming full redox conversion between $Fe^{2+}$ and $Fe^{3+}$, the $H_2$ production capacity of Fe-based oxides would correspond to 0.5 mol of $H_2$ per 1 mol of Fe. We call such capacity the "redox limit". Nickel ferrite ($NiFe_2O_4$), for example, has a redox limit of 95.6 mL-$H_2$/g, an order of magnitude higher than the experimental yields. The redox limits of $Fe_{0.35}(MgCoNi)_{0.65}O_x$ (x≈1.25) and $(FeMgCoNi)O_x$ (x≈1.21) are estimated to be 55.8 mL-$H_2$/g and 40.7 mL-$H_2$/g, respectively. Values of x were determined assuming Fe is +3, Co is a mixture of +2 and +3 (in the form of $Co_3O_4$), and Mg and Ni are +2, according to the X-ray absorption near-edge structure (XANES) results. Long two-step TWS cycles with a high purge gas flow rate (200 sccm Ar) were conducted in the TGA in an attempt to approach the thermodynamic limits of PCOs with the help of faster gas phase transport and a longer reaction time. As shown in FIG. 2E, at $T_H=1300°$ C. (5 hrs) and $T_L=800°$ C. (10 hrs) and $H_2:H_2O=1:1044$, the PCO $Fe_{0.35}(MgCoNi)_{0.65}O_x$ yields 15.30±0.15 mL-$H_2$/g, which is 27.4% (normalized yield) of its redox limit; the PCO $(FeMgCoNi)O_x$ gives 11.96±0.15 mL-$H_2$/g, 29.5% of its redox limit. In FIG. 2F, $T_H=1100°$ C.

(5 hrs) and $T_L=600°$ C. (10 hrs) and $H_2:H_2O=1:1044$, PCOs show more than twice of the normalized yields from ferrites. With an even longer dwell time (10 hrs thermal reduction and 20 hrs water splitting), $(FeMgCoNi)O_x$ gives 3.65±0.15 mL-$H_2$/g. For comparison, we also carried out the long cycle tests for the conventional ferrite materials. Extending reaction time increases their $H_2$ yields, shown in FIG. 2E and FIG. 2F, though still significantly less than PCOs. These results suggest that the redox activity of Fe in PCOs is enhanced presumably due to cation mixing effect.

Figure 3A:
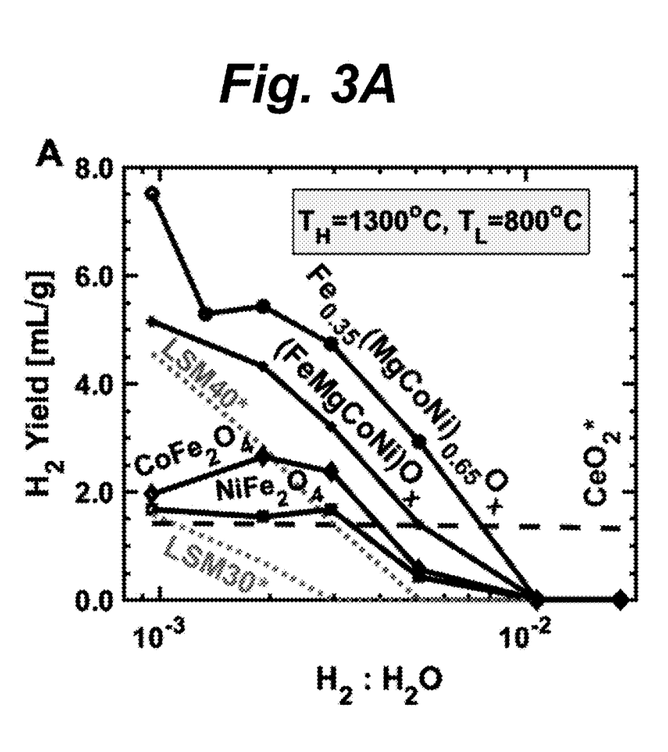
FIGS. 3A-D are graphs illustrating results of experiments on the influence of background gas environment and composition stoichiometry on the performance of poly-cation oxides which may be used in embodiments of the invention.
Figure 3B:
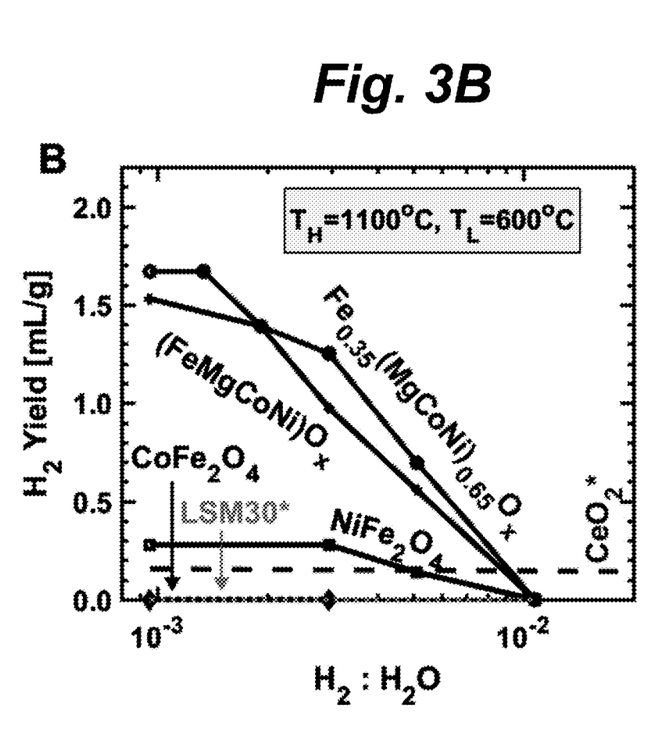

FIGS. 3A-D illustrate results of experiments on the influence of background gas environment and composition stoichiometry on the performance of poly-cation oxides (PCOs). Specifically, these figures show the influence of background partial pressure ratio of $H_2$ and $H_2O$ [$p(H_2):p(H_2O)$] on thermochemical water splitting of sol-gel (SG) synthesized PCOs, compared to ceria, perovskite LSM30 ($La_{0.7}Sr_{0.3}MnO_{3-\delta}$), perovskite LSM40 ($La_{0.6}Sr_{0.4}MnO_{3-\delta}$) (all calculated from thermodynamic data, indicated by *) and SG-synthesized ferrites for $T_H=1300°$ C., $T_L=800°$ C. (FIG. 3A), and for $T_H=1100°$ C., $T_L=600°$ C. (FIG. 3B).

FIG. 3A shows the $H_2$ yield of $Fe_{0.35}(MgCoNi)_{0.65}O_x$ at $T_H=1300°$ C. and $T_L=800°$ C. and at various ratios of background $H_2:H_2O$ values compared to that of ferrites, thermodynamic limits of ceria, and perovskites such as LSM30 ($La_{0.7}Sr_{0.3}MnO_{3-\delta}$). LSM30, along with LSM40 and LSM50 (not shown), thermodynamically produces less $H_2$ than PCOs within the $H_2:H_2O$ range considered, and the $H_2$ production of LSMs decays quickly to zero as $H_2:H_2O$ increases above around 1:300. On the other hand, PCOs display a similar decaying behavior as ferrites when $H_2:H_2O$ increases, and with much higher $H_2$ yield. $CeO_2$ is only weakly affected by $H_2:H_2O$, though the negligible extent of reduction at 1300° C. and even more so at 1100° C. renders the cycle ineffective. We note the prior work on perovskites that reported water splitting did not use a background $H_2$ and relied on a large flow rate of water vapor to suppress the reverse reaction, which operates in the regime of vanishing $H_2:H_2O$ ratio. FIG. 3B shows the same trend at the cycle condition $T_H=1100°$ C. and $T_L=600°$ C., where the PCOs demonstrate even bigger advantage. LSMs thermodynamically cannot produce $H_2$ at such condition within the $H_2O$ range considered. Such trends prove that PCOs can split water at substantially higher steam-to-$H_2$ conversion than ceria, ferrites and Mn-based perovskites, which has practical significance in scale-up.

Figure 3C:
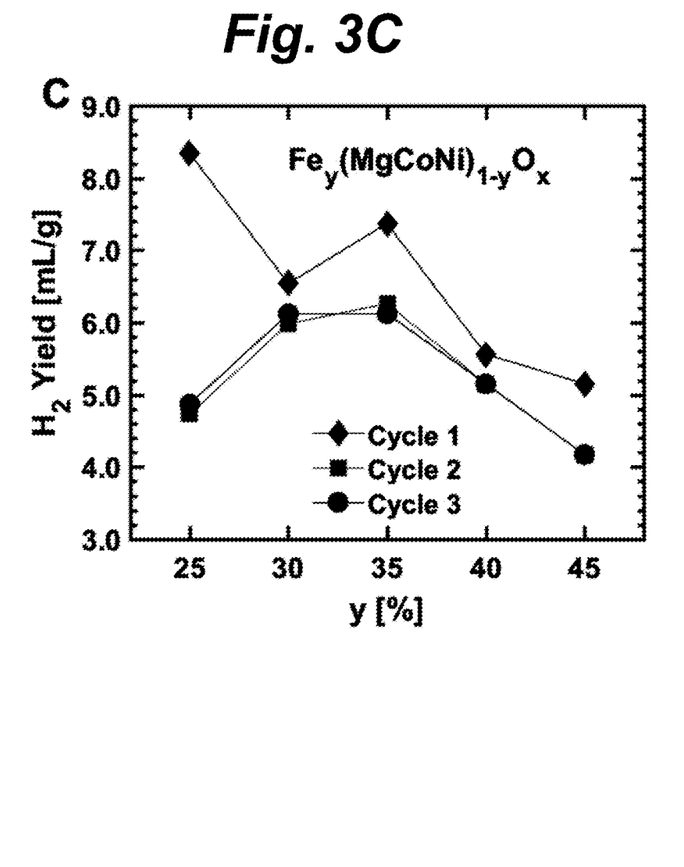
Figure 3D:
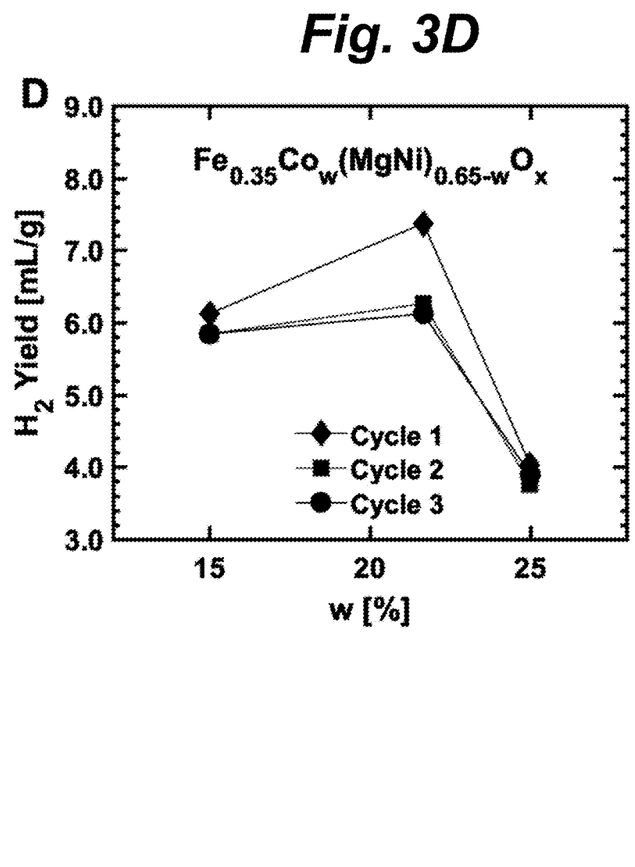

We found that the active redox partner in the PCOs is Fe. In FIG. 3C and FIG. 3D are shown the influence of Fe and Co stoichiometry on thermochemical water splitting performance of solid-state (SS) synthesized PCOs [$T_H=1300°$ C., $T_L=800°$ C. and $p(H_2):p(H_2O)=1:1044$]. At y=0.35, $Fe_y(MgCoNi)_{1-y}O_x$ is shown to have the best performance. At w=0.22, $Fe_{0.35}Co_w(MgNi)_{1-w}O_x$ outperforms the other w values. For all the measurements, samples were held at $T_H$ for 30 minutes and at $T_L$ for 1 hour. For SS-synthesized $Fe_y(MgCoNi)_{1-y}O_x$, we found the optimal y=0.30~0.35, which maximizes the $H_2$ yield. We hypothesize that if the Fe molar ratio is too low, the available amount of redox element per unit mass of oxide is limited; but if the Fe molar ratio is too high, the cation mixing effect is likely to be weakened, as if approaching the ferrite stoichiometry. Starting from $Fe_{0.35}(MgCoNi)_{0.65}O_x$, the influence of Co ratio was further investigated (FIG. 3D). Deviating from the equimolarity of Co, Mg and Ni lowers the $H_2$ yield.

Figure 4A:
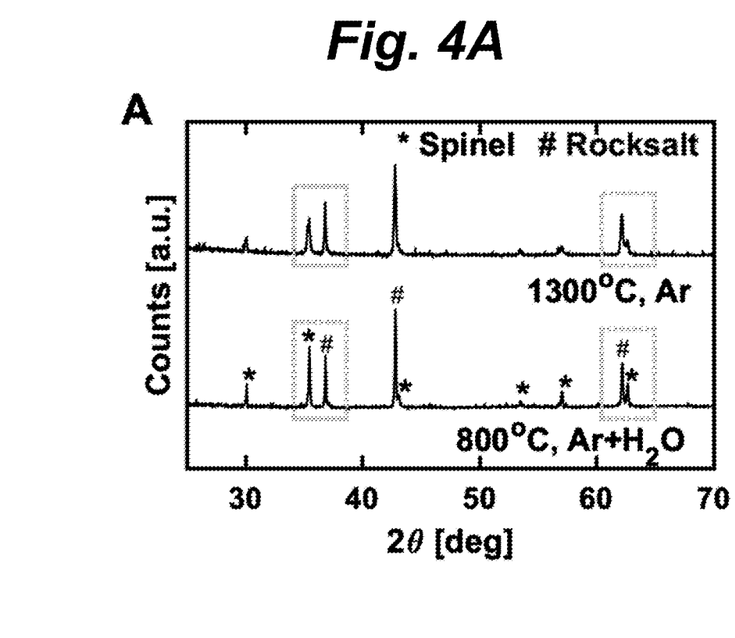
FIGS. 4A-D are experimental graphs showing results of structural and elemental characterizations of solid-state synthesized samples of a poly-cation oxide which may be used in embodiments of the invention.
Figure 4B:
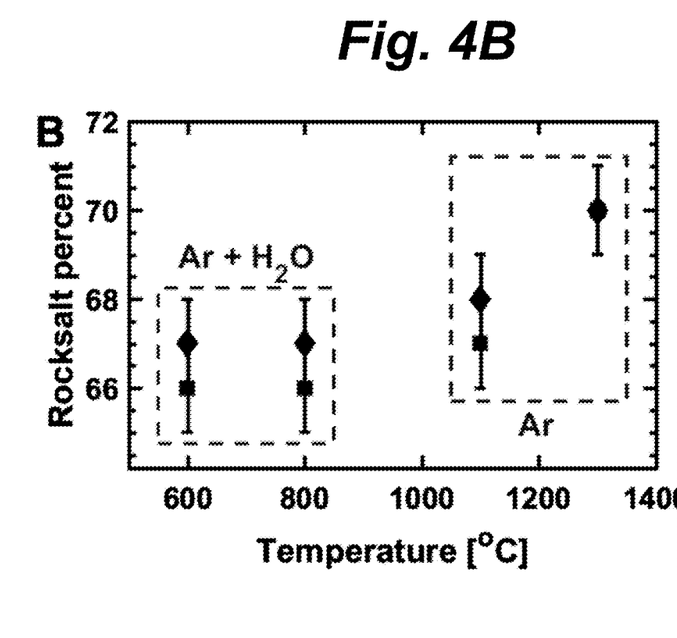
Figure 4C:
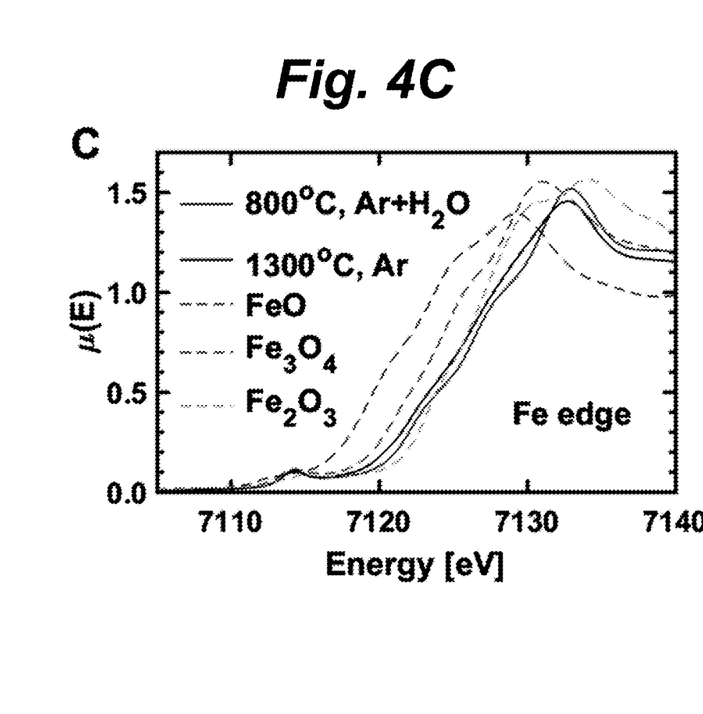
Figure 4D:
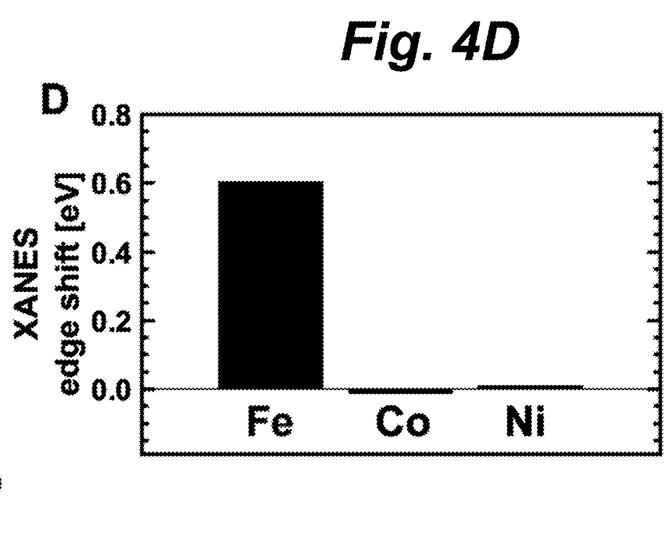

FIGS. 4A-D shows results of structural and elemental characterizations of solid-state synthesized samples of $(FeMgCoNi)O_x$. FIG. 4A shows Cu Kα X-ray diffraction (XRD) of thermally reduced and water-oxidized (FeMgCoNi)$O_x$. The change of peak intensity qualitatively illustrates the rocksalt-spinel phase swing in this oxide. FIG. 4B shows Rietveld refinement result of XRD patterns at various quenching conditions. Two sets of (FeMgCoNi)$O_x$ were made by solid-state synthesis and quenched at four different temperature/gas conditions as indicated. Refinement result of each set is shown with one shape/color of data points. Both sets show similar trend of phase ratio change repeatedly. Increased reduction of the PCO leads to higher rocksalt (volumetric) ratio. FIG. 4C shows x-ray absorption near edge structure (XANES) result for the Fe edge of quenched (FeMgCoNi)$O_x$. The dashed lines indicate reference data of different iron oxides with different oxidation states of Fe. Oxidation state of Fe in the PCO sample is close to +3. The shift of Fe oxidation state is clearly demonstrated between the oxidized and reduced states of (FeMgCoNi)$O_x$. FIG. 4D shows amount of edge shift (eV) for Fe, Co, and Ni between the reduced and oxidized states of (FeMgCoNi)$O_x$ measured by XANES. Fe is the redox-active cation in this PCO, as Co and Ni have almost no edge shift during the redox cycle. Labels "800° C., Ar+$H_2O$" indicates the water splitting condition, where there was no $H_2$ background (different from TGA and stagnation flow reactors); "1300° C., Ar" indicates the thermal reduction condition. This PCO was quenched from these conditions before being characterized.

In order to elucidate the redox reaction mechanism of (FeMgCoNi)$O_x$ during two-step TWS, quenching experiments were performed, assuming sample structure and property are maintained when quenched at the end of thermal reduction or water splitting reaction. The X-ray diffraction (XRD) results in FIG. 4A on the quenched (FeMgCoNi)$O_x$ samples confirm that both rocksalt and spinel phases co-exist during thermal cycling, but their ratio changes as temperatures and gas environments vary, indicating a swing between the two phases. Rietveld refinement was conducted on the obtained XRD patterns. Since Fe, Co and Ni have very similar scattering factors in the XRD conditions, only Fe is needed to account for all three elements in the Rietveld model. The rocksalt phase was assumed to be $FeO_tO$ (t<1) and the spinel phase was assumed to be $Fe_3O_4$. FIG. 4B shows the phase volumetric percentage of the rocksalt phase obtained from the Rietveld refinement of XRD patterns from two repetitions of (FeMgCoNi)$O_x$ synthesis, quenching (at four different temperature/gas conditions shown in the figure), and XRD measurements. Both sets of data show a consistent trend: the ratio depends mainly on temperature, and higher temperatures generally give more rocksalt phase associated with greater oxygen release. The observed higher $H_2$ production in the 1300-800° C. cycles could arise from the larger extent of phase swing associated with oxygen exchange compared to the 1100-600° C. cycles.

FIG. 4C shows the XANES data to detect changes in the oxidation states of the transition metals via the shift of the X-ray absorption edge; Mg was assumed not to change valence state. To compare the absorption edge, we compared the energy at the half of the maximum intensity in the normalized absorption spectrum. The experiments showed that Fe has an edge shift of about 0.6 eV (compares to 4.3 eV between Fe 2+ and 3+), which indicates an oxidation state change of 0.14. Interestingly, as FIG. 4D shows, Co and Ni are essentially redox inactive compared to Fe, suggesting that Fe is the only redox-active element in the PCO (FeMgCoNi)$O_x$. Nevertheless, Mg, Ni and Co contribute to enabling Fe to provide its unprecedented performance at reduced temperatures in these PCO materials. Surprisingly, by adding Mg and Ni to a Fe—Co—O system, the $H_2$-performance is significantly improved.

In addition to the application to water-splitting, the gas reduction process may also be applied to other gasses.

For $CO_2$ reduction, the two-step thermochemical $CO_2$ splitting process for CO production (FIG. 1A and FIG. 1B) includes repeatedly cycling a thermal reduction step and a $CO_2$ splitting step. The thermal reduction step includes heating a poly-cation oxide under a reduced partial oxygen pressure, producing a reduced poly-cation oxide and oxygen gas. The $CO_2$ splitting step include reacting the reduced poly-cation oxide with $CO_2$ to produce CO and reoxidized poly-cation oxide.

The thermodynamic analysis is analogous to that for water splitting since the $CO_2$/CO has similar thermodynamic properties as $H_2O/H_2$. Poly-cation oxides containing Fe and has relatively high melting point, such as (Mg,Fe,Co,Ni)$O_x$, are preferred for such two-step cycle. Thermal reduction happens at around 1000° C., and $CO_2$ splitting happens at around 600° C., depending on the specific poly-cation oxide that is used and on $O_2$ and on CO background partial pressures used during the thermal reduction and $CO_2$ splitting steps, respectively. Thermodynamically, it is preferred to have low $O_2$ partial pressure (~$10^{-5}$ atm) during thermal reduction step and low CO partial pressure (~$10^{-4}$ atm) during $CO_2$ splitting step.

By this two-step cycle, $CO_2$ is converted to CO and thermal energy is stored. CO is feedstock for steel and methanol productions, Monsanto process and Fischer-Tropsch process in industry. At the same time, thermal energy is stored and can be used for heat recovery.

For $NO_x$ reduction, the two-step thermochemical $NO_x$ reduction process includes repeatedly cycling a thermal reduction step and a $NO_x$ reduction step. The thermal reduction step includes heating a poly-cation oxide under a reduced partial oxygen pressure, producing a reduced poly-cation oxide and oxygen gas. The $NO_x$ reduction step includes reacting the reduced poly-cation oxide with $NO_x$ to produce $N_2$ and reoxidized poly-cation oxide.

The thermodynamic analysis for $NO_x$ reduction is analogous to water splitting. Poly-cation oxides containing Fe and has relatively high melting point, such as (Mg,Fe,Co,Ni)$O_x$, are preferred for such two-step cycle. Thermal reduction happens at around 1000° C., and $NO_x$ reduction happens at around 600° C., depending on the specific poly-cation oxide that is used and on the $O_2$ and $N_2$ background partial pressures during the thermal reduction and $NO_x$ reduction steps, respectively. Thermodynamically, it is preferred to have low $O_2$ partial pressure (~$10^{-5}$ atm) during thermal reduction step and low $N_2$ partial pressure (~$10^{-4}$ atm) during $NO_x$ reduction step.

By this two-step cycle, pollutant $NO_x$ can be converted to $N_2$ which is the main component in air. This can be used to eliminate $NO_x$ in industrial exhaust.

Variations of the invention are also contemplated. Although the description has specifically discussed examples of water splitting, carbon dioxide splitting, and $NO_x$ reduction, the process may also be applied to reduction of other gasses using the same principles. For example, applications include syngas production by combining water splitting for hydrogen production and reduction of carbon dioxide to carbon monoxide. Applications also include various chemical looping reactions for hydrocarbon fuel production, and thermal energy storage.

From the viewpoint of chemical reactor systems, we note that while most reactor architectures for such reactions so far have used solar concentrators as a heat source, the increasing availability of low-cost carbon-free electricity suggests that localized electrical heating could be used for TWS as well, thus opening more options for system architectures using PCOs as the water splitting materials in various configurations.

Even though this description makes reference to specific PCO compositions, those skilled in the art will understand from the teachings contained herein that the principles and methods apply to other similar materials. For example, many variations in the number of component oxides and the metal species are possible, and may be used to achieve better performance.

In conclusion, the invention provides a two-step thermochemical gas reduction process comprising repeatedly cycling a thermal reduction step and a gas reduction step using a new class of materials, poly-cation oxides (PCOs), which can thermochemically reduce gasses with remarkably high yields that exceed the measured values of state-of-the-art materials. For example, $H_2$ production with PCOs is demonstrated at thermal reduction temperatures as low as 1000° C. that are not observed for two-metal ferrites and ceria.

The invention claimed is:

1. A two-step thermochemical gas reduction process comprising repeatedly cycling a thermal reduction step and a gas reduction step;
   wherein the thermal reduction step comprises heating a poly-cation oxide under a reduced partial oxygen pressure, producing a reduced poly-cation oxide and oxygen gas;
   wherein the gas reduction step comprises reacting the reduced poly-cation oxide with a first gas to produce a second gas and reoxidized poly-cation oxide, wherein the first gas is reduced into the second gas;
   wherein the poly-cation oxide has at least two distinct crystal structures at two distinct temperatures corresponding to two distinct average oxidation states of at least one transition metal in a transformation between the poly-cation oxide and the reduced poly-cation oxide;
   wherein the poly-cation oxide is selected from the group consisting of
   a) an equimolar mixture of MgO, CoO, NiO, FeO and ZnO,
   b) $(MgFeCoNi)_{0.8}Li_{0.1}Ga_{0.1}O_x$,
   c) $(LiMgFeCoNi)O_x$,
   d) $(MgAlFeCoNi)O_x$,
   e) $(MgTiMnCoNi)_{0.75}Fe_{0.25}O_x$,
   f) $(MgMnCoNi)_{0.75}Fe_{0.25}O_x$,
   g) $(MgFeCoNiZn)O$, and
   h) $(MgFeCoNiCe)O_x(CoNi)_{0.65}Fe_{0.35}O_x$,
   where compositions in parentheses correspond to equimolar concentrations, and where x is an appropriately chosen constant.

2. The two-step thermochemical gas reduction process of claim 1 wherein the gas reduction process is a water splitting process for hydrogen gas production;
   wherein the gas reduction step is a water splitting step;
   wherein the first gas is water vapor and the second gas is hydrogen gas.

3. The two-step thermochemical gas reduction process of claim 1
   wherein the gas reduction process is a $CO_2$ splitting process for CO gas production;
   wherein the gas reduction step is a $CO_2$ splitting step;
   wherein the first gas is $CO_2$ and the second gas is CO.

4. The two-step thermochemical gas reduction process of claim 1
   wherein the gas reduction process is a nitrogen oxide reduction process for $N_2$ gas production;
   wherein the gas reduction step is a nitrogen oxide reduction step;
   wherein the first gas is nitrogen oxide and the second gas is $N_2$.

* * * * *